June 24, 1924.
O. NYGARD
AGRICULTURAL MACHINE
Filed June 12, 1922  3 Sheets-Sheet 2
1,499,245
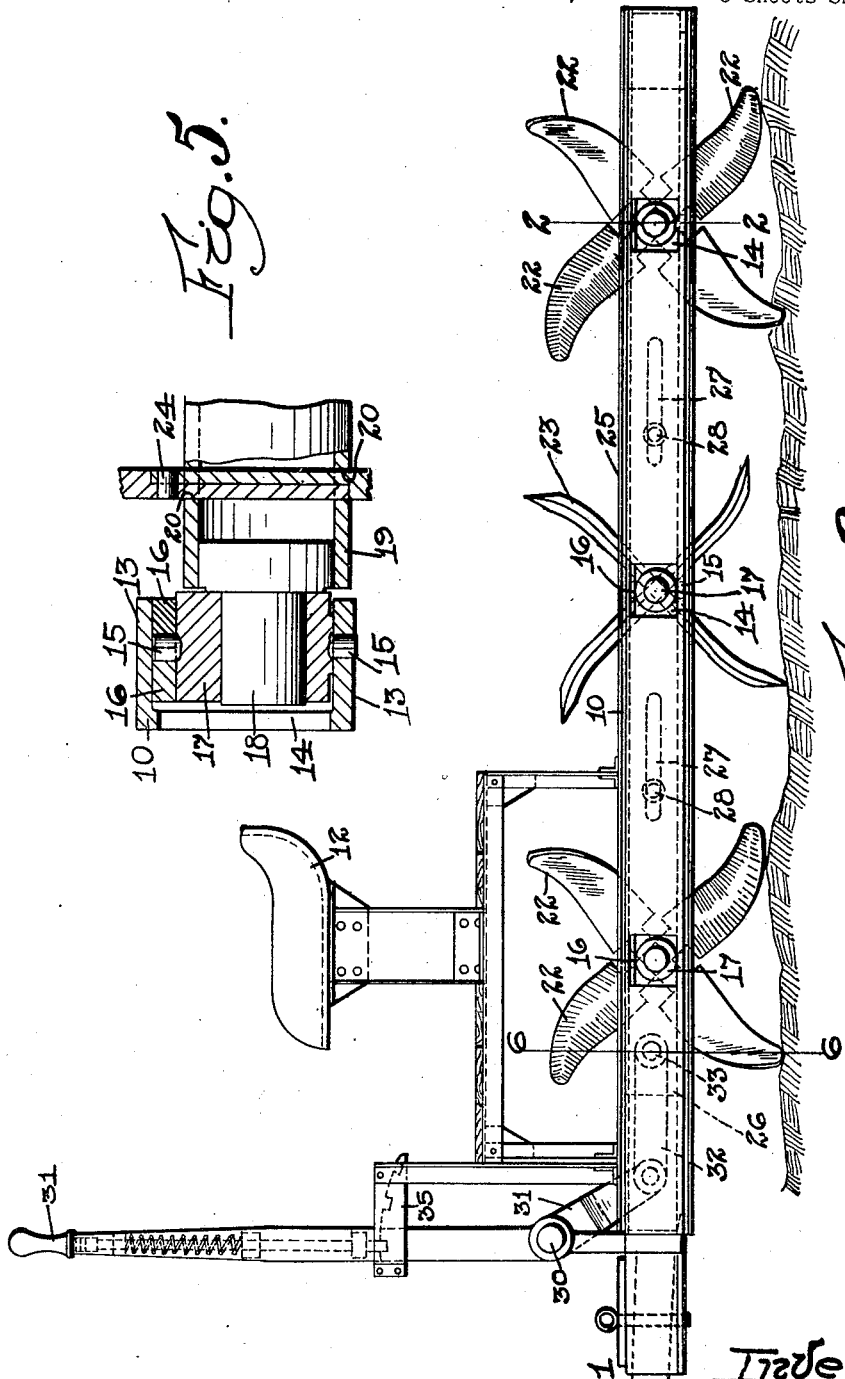
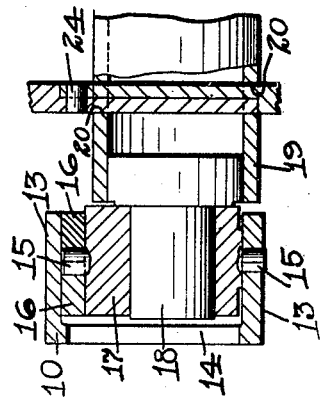
Fig. 5.
Fig. 2.
Inventor:
Oscar Nygard
By Attorneys June 24, 1924.
O. NYGARD
AGRICULTURAL MACHINE
Filed June 12, 1922
1,499,245
3 Sheets-Sheet 3
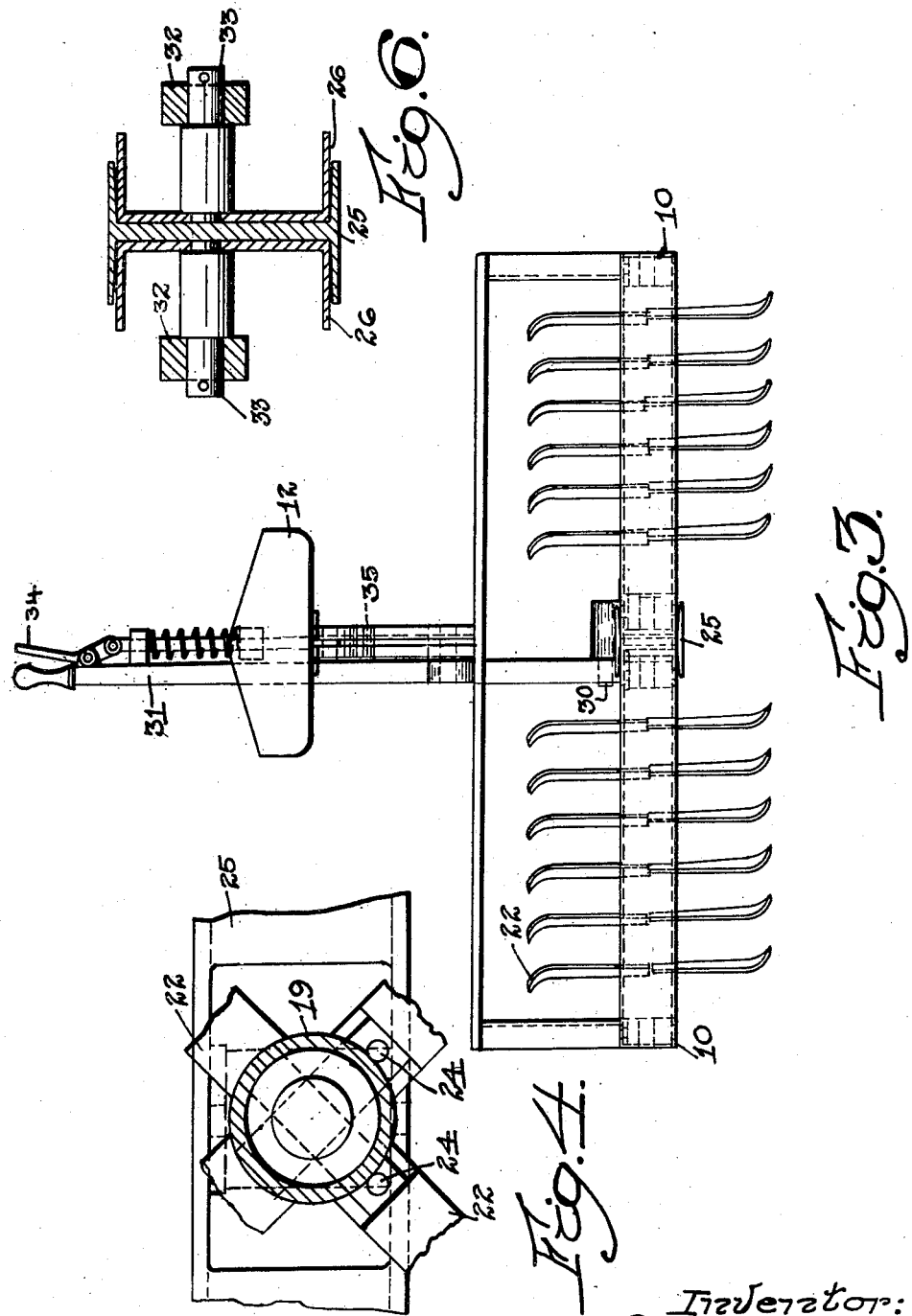

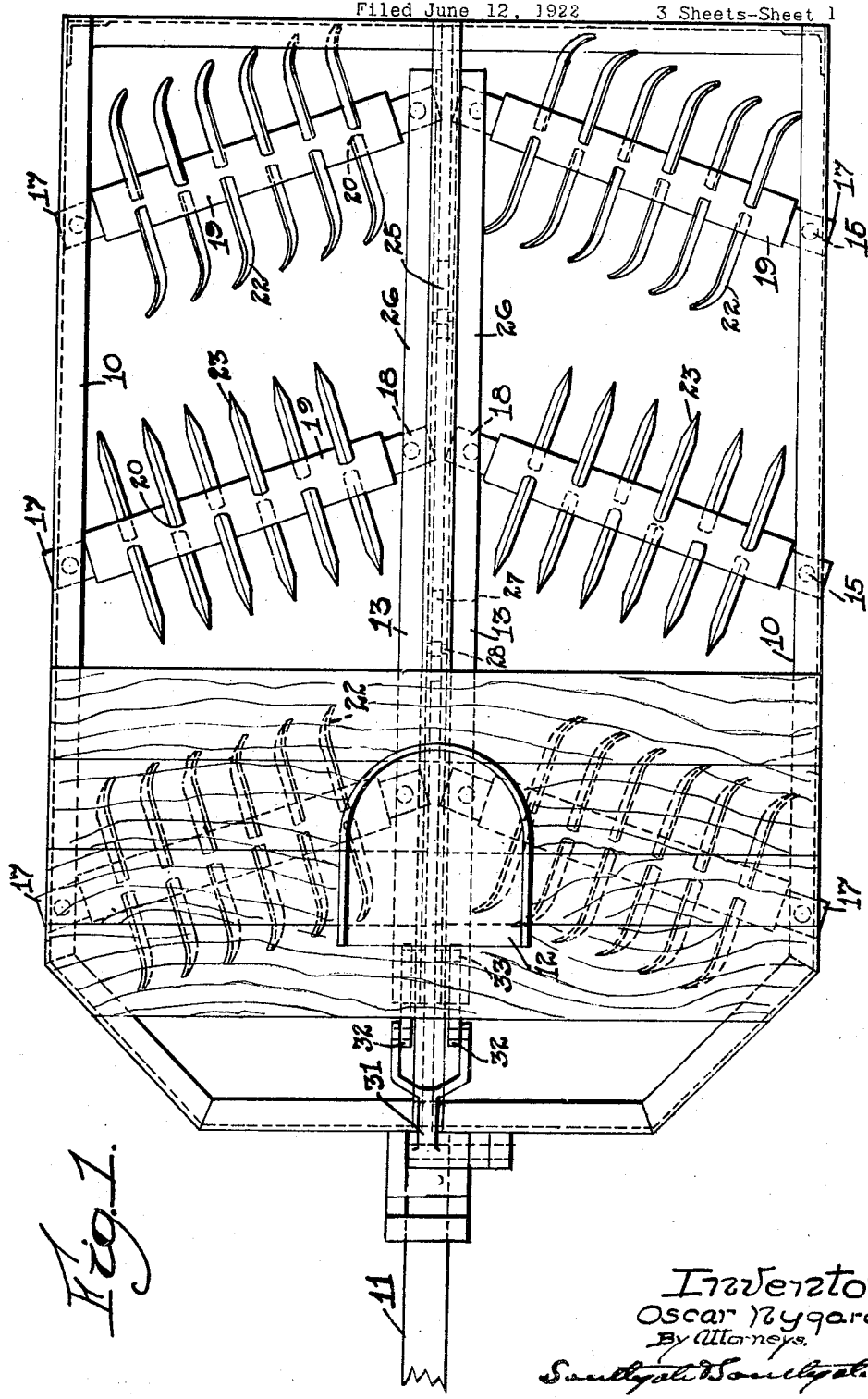

Patented June 24, 1924.

1,499,245

UNITED STATES PATENT OFFICE.

OSCAR NYGARD, OF WORCESTER, MASSACHUSETTS.

AGRICULTURAL MACHINE.

Application filed June 12, 1922. Serial No. 567,627.

*To all whom it may concern:*

Be it known that I, OSCAR NYGARD, a citizen of Finland, residing at Worcester, in the county of Worcester and State of Massachusetts, have invented a new and useful Agricultural Machine, of which the following is a specification.

This invention relates to a device for plowing up and harrowing the ground on a large scale and particularly to a machine adapted to be drawn over the ground by horses, automobile or tractor, which will both break up new ground into large clods and also break these clods up into smaller pieces so as to leave the ground in a thoroughly pulverized condition suitable for receiving seed broadcast or for being furrowed for the planting of seeds in that way, and more specially to provide a device of this kind in which the means for operating on the ground is divided into two parts, rotary blades for cutting the sod or crust of the earth and rotary forks for pulverizing the clods produced by the blades.

The principal objects of the invention are to provide an arrangement of the blades and forks of such a nature that the ground is first cut up by the blades, then forked and finally thoroughly cut up again by a similar set of blades in which the blades and forks can be arranged at any desired angle across the machine so that they will work efficiently on different kinds of ground; and to provide an adjusting device for this purpose adapted to be operated by the driver.

The invention also involves efficient means for mounting the shafts of the blades and forks in such a way that they can be swung into an angular position as described above, and a simple and effective means for securing the butt ends of these blades to the shafts on which they are mounted.

The invention also involves additional features and combinations, as will appear hereinafter.

Reference is to be had to the accompanying drawings, in which—

Fig. 1 is a plan of a machine constructed in accordance with the invention and shown in its usual position for operation;

Fig. 2 is a side view of the same;

Fig. 3 is a rear view;

Fig. 4 is a detail view on an enlarged scale of one of the cylinders showing the attachment of the blades or forks thereto;

Fig. 5 is a longitudinal central sectional view of one of the cylinders showing the same enlarged and illustrating how it is hung on the frame; and Fig. 6 is a section on the line 6—6 of Fig. 1.

The invention is shown in a form embodying a horizontal frame 10 provided with any kind of means as 11 by which it can be drawn along by horses, tractor or other automobile and provided with a seat 12 for the operator or driver. The frame is shown as made of structural iron shapes but that is not essential. It preferably consists of parts located all in the same plane and thus constitutes a very simple device for the purpose intended.

It is provided at its sides with two horizontal flanges 13 the lower ones of which have vertical perforations. Plates 16, similarly perforated, are fixed separately under the upper flanges 13. Through the perforation extend the ends of a vertical pintle 15. The same construction is used at the center. This pintle 15 in each case oscillatably supports a box 17 and these boxes support studs 18 which constitute the ends of a series of shafts 19. These shafts thus have their bearings in the boxes 17 and these boxes permit of their oscillation about the vertical axes of the several pintles 15. Each U-frame is cut out at 14 to allow this.

The shafts 19 can be made of solid pieces of wood cut into cylindrical form or, in fact, any other form, but I prefer to make them of pieces of pipe having the studs 18 firmly fixed thereto and projecting therefrom. These pipes are provided with sets of opposite perforations 20. Into these perforations project extensions 21 on the butt ends of several blades 22 or forks 23. In each case the end of the blade or fork extends up to and fits on to the circumference of the pipe and the projection from it extends all the way through the pipe and thus through two of the perforations 20. Just at the opposite point another blade or fork 22 constructed in the same way, but arranged right and left hand with respect to the first one, has an extension projecting through. These are pinned together by pins 24 and that constitutes the only fastening means required for two of the blades or forks.

It is to be noted that the blades at the circumference of the shafts are arranged radially and all in the same plane but that they are twisted all in the same direction as they progress away from the pipe. The forks 23 are constructed substantially in the same way. It will be noted that I have shown three sets of these shafts or pipes 19, the front and rear ones having wide blades 22 and the central ones having narrow blades or forks 23. These shafts are arranged loosely in their bearings so as to be capable of being turned by the drawing over the earth of the frame resting on the forks and blades. No means for turning them is required.

The inner ends of the shafts or pipes 19 are made movable, that is, the boxes 17 in which they are located are hung on longitudinally movable frames 26. These horizontal frames 26 are located on the opposite sides of a central I-beam 25 constituting a part of the frame 10 and supported by the bottom flange thereof. They support the inner ends of the shafts in the same manner as their outer ends are shown supported in Fig. 5. When they move the studs 18 can slide in an axial direction in the boxes 17 to permit the motion. These sliding frames 26 are arranged to receive cross pins 33 adapted to be reciprocated by links 32 as will now appear. The channel frames 26 have horizontal slots 27 for receiving pins 28 on the I-beam to positively guide the frames.

Mounted on a pivot 30 is an adjusting handle 31 connected by two links 32 with a cross pin 33 which is connected to both of the frames 26 and causes them to move forward and backward with it. This operating handle has an ordinary spring pressed pawl 34 adapted to engage in the notches of an arc-shaped rack 35 for holding the frames 26 in any adjusted position. It can conveniently be located near the operator's seat 12 so that he can adjust the device as he sees fit. This adjustment is made with the idea that ordinarily the device will be used with the shafts in an angular position, as shown in Fig. 1. This throws the several blades or forks of each of the set of four out of alignment with each so that as they rotate they do not cut through exactly the same space. They can be thrown far enough out of alignment so that the operations of one blade, for example, will overlap those of some of the blades spaced from it on the same shaft.

In the operation of the device, the parts being set substantially as shown in Fig. 1 and the device being drawn over the ground, the first set of blades will cut up the ground and form it into clods of earth as will be obvious, the next set of forks having a harrowing action breaking up the clods and reducing the earth to reasonably fine condition. The third set is shown in the form of wide blades although another set of forks can be used, if desired, or the third set in many cases may be omitted. This set of blades is designed to complete the operation and soften up any part of the ground that may not have been operated upon either by the sets of blades or forks in advance of it.

By setting the shafts at an angle to the transverse dimension of the device and inclining them in opposite ways on the two sides as illustrated all danger of all four blades located in one section on a shaft cutting through the same furrow and thus not having the full effect desired, is avoided. Each blade cuts a little to the right or left of the blade immediately preceding it and in alignment with it around the shaft. It will be observed also that in case the device is not cutting enough and not fining the earth enough the angle of the shafts can be increased or decreased at the will of the operator. Furthermore, in case of failure of any shaft to rotate because of meeting some obstruction, this can often be avoided by instantly moving the shafts into alignment with each other across the machine where all four blades will cut through along the same line. In this way, a single device is used on many kinds of ground in place of a plow and harrow. This reduces the time required for preparing the field for seed and also obviously reduces the labor cost by substantially fifty per cent. Furthermore, by designing the blades carefully and curving the blades as indicated and setting them into the ground in an angular direction, the thoroughness of the operation is assured.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described but what I claim is:—

1. In an agricultural machine of the character described, the combination with a frame, of bearings depending therefrom, boxes mounted in said bearings, shafts each consisting of a hollow pipe having studs at its ends having bearings in said boxes, each of said pipes having at intervals therealong two opposite perforations, blades having extensions projecting all the way across each pipe through two of said perforations, said blades being arranged in opposite pairs, and means for fastening the two blades of a pair together on the outside of said shaft.

2. In an agricultural machine of the character described, the combination with a horizontal frame having a longitudinal central I-shaped beam constituting a rigid part thereof, of a pair of channel shaped frames slidably supported on the bottom flanges of said beam, a plurality of boxes pivoted in said slidable frames and pivotally mounted on vertical axes, shafts having ends or studs supported in said boxes, said shafts being provided with blades projecting therefrom in several directions adapted to be rotated by movement of the device along the ground, and means for reciprocating said slidable frames, whereby one end of each shaft can be moved forward or backward to change the angle which the shafts make with the line of motion of the machine.

In testimony whereof I have hereunto affixed my signature.

OSCAR NYGARD.